United States Patent [19]

Montagna et al.

[11] Patent Number: 4,899,292

[45] Date of Patent: Feb. 6, 1990

[54] SYSTEM FOR STORING AND RETRIEVING TEXT AND ASSOCIATED GRAPHICS

[75] Inventors: John A. Montagna, Trenton; Gary Irving, Skillman; Lee Farrell, Lawrenceville, all of N.J.; Gerald Cross, Philadelphia; Stephen A. Miller, Upper Black Eddy, both of Pa.

[73] Assignee: Image Storage/Retrieval Systems, Inc., Langhorne, Pa.

[21] Appl. No.: 163,398

[22] Filed: Mar. 2, 1988

[51] Int. Cl.⁴ ................................................ G06F 3/03
[52] U.S. Cl. .................................. 364/521; 364/401; 340/724; 340/731
[58] Field of Search ............... 364/512, 521, 525, 188, 364/400, 401, 900 MS File; 340/716, 721, 724, 731

[56] References Cited

U.S. PATENT DOCUMENTS

| | | |
|---|---|---|
| 3,829,844 | 8/1974 | Zonneveld et al. ............ 340/172.5 |
| 3,974,482 | 8/1976 | Balashov et al. ............... 340/172.5 |
| 4,060,915 | 12/1977 | Conway ............................. 35/9 |
| 4,413,314 | 11/1983 | Slater et al. ...................... 364/188 |
| 4,420,234 | 12/1983 | Dolejsi et al. .................. 364/525 X |
| 4,752,908 | 6/1988 | Bouillot ......................... 340/716 X |

OTHER PUBLICATIONS

ADP Multi-Worksheet Documents—#1–#5.

Primary Examiner—Gary V. Harkcom
Assistant Examiner—Mark K. Zimmerman
Attorney, Agent, or Firm—Barry R. Lipsitz

[57] ABSTRACT

An insurance estimation, service manual or other system stores and displays documents and associated graphics. The system stores a multiplicity of the graphic images in compressed, digital form. A first group of the graphic images are associated with a first one of the documents. By selecting the first document, the system automatically decompresses the first plurality of graphic images. The system then displays at least a portion of the selected first document on a display screen along with a first one of the decompressed graphic images. Subsequently, upon touch of a touch screen, the system displays a second one of the decompressed documents. Because the second graphic image was decompressed when the document was selected, there was virtually no delay in displaying the second graphic image. Either graphic image can be enlarged and centered about or near a point of touch over the image. In a service manual system, the document comprises text describing steps for repairing a vehicle and the graphic images illustrate portions of the vehicle under repair. In the insurance estimation system, the system displays a graphic image of a vehicle or other object, and damaged parts are identified by means of the touch screen.

18 Claims, 14 Drawing Sheets

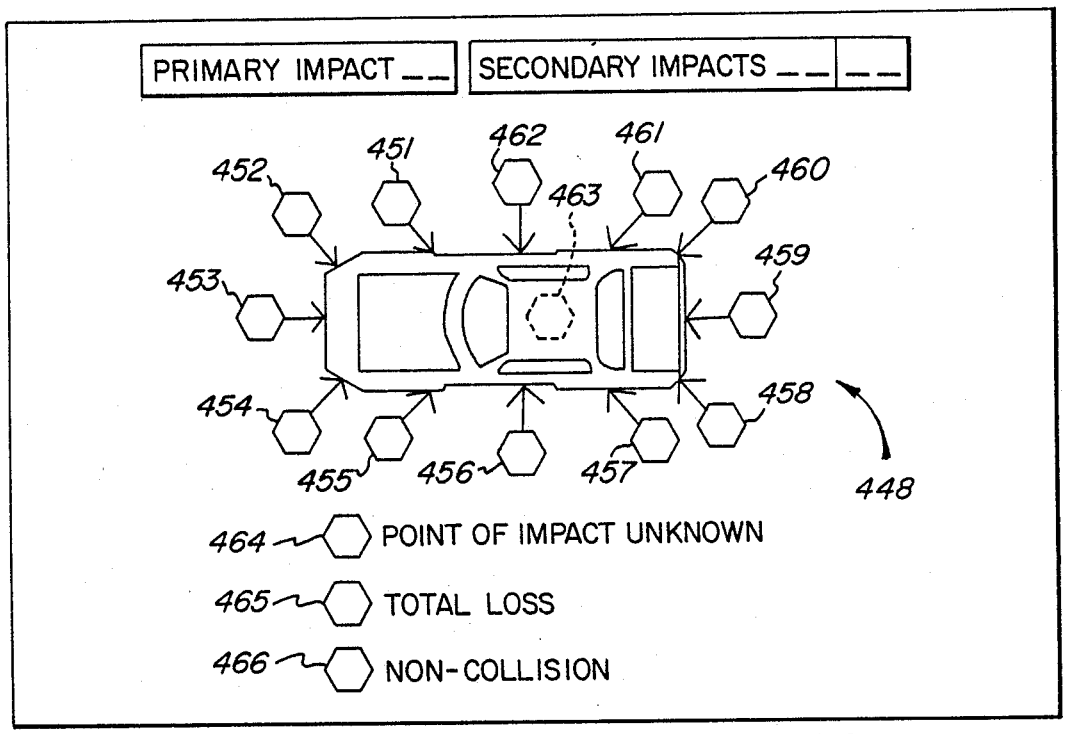
FIG. 14
FIG. 15
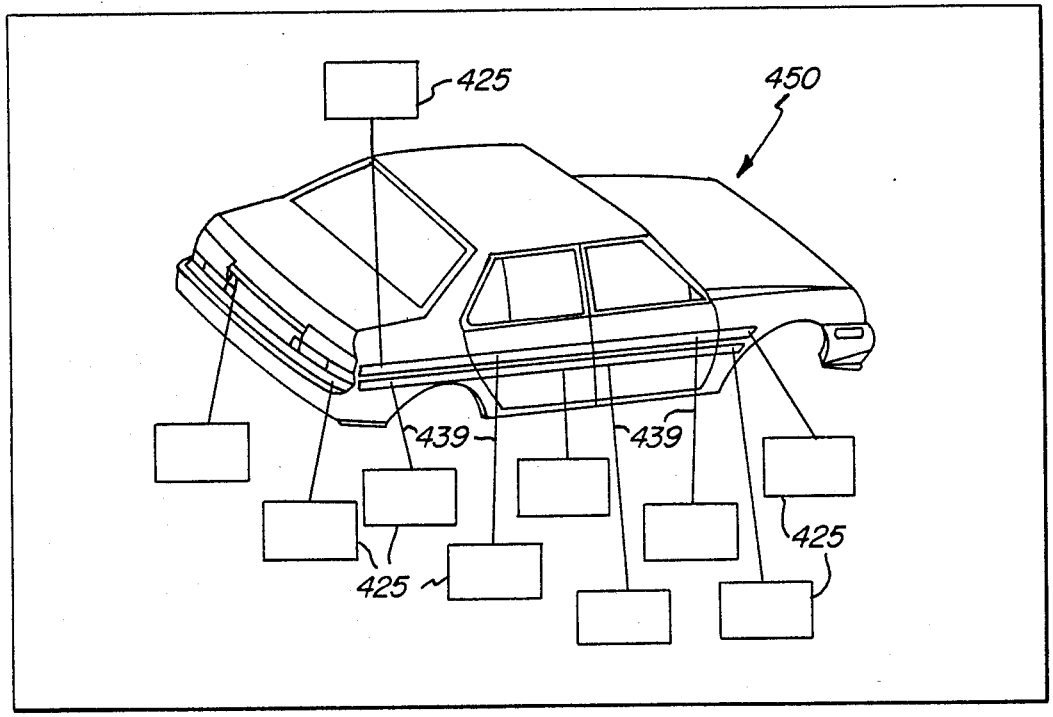

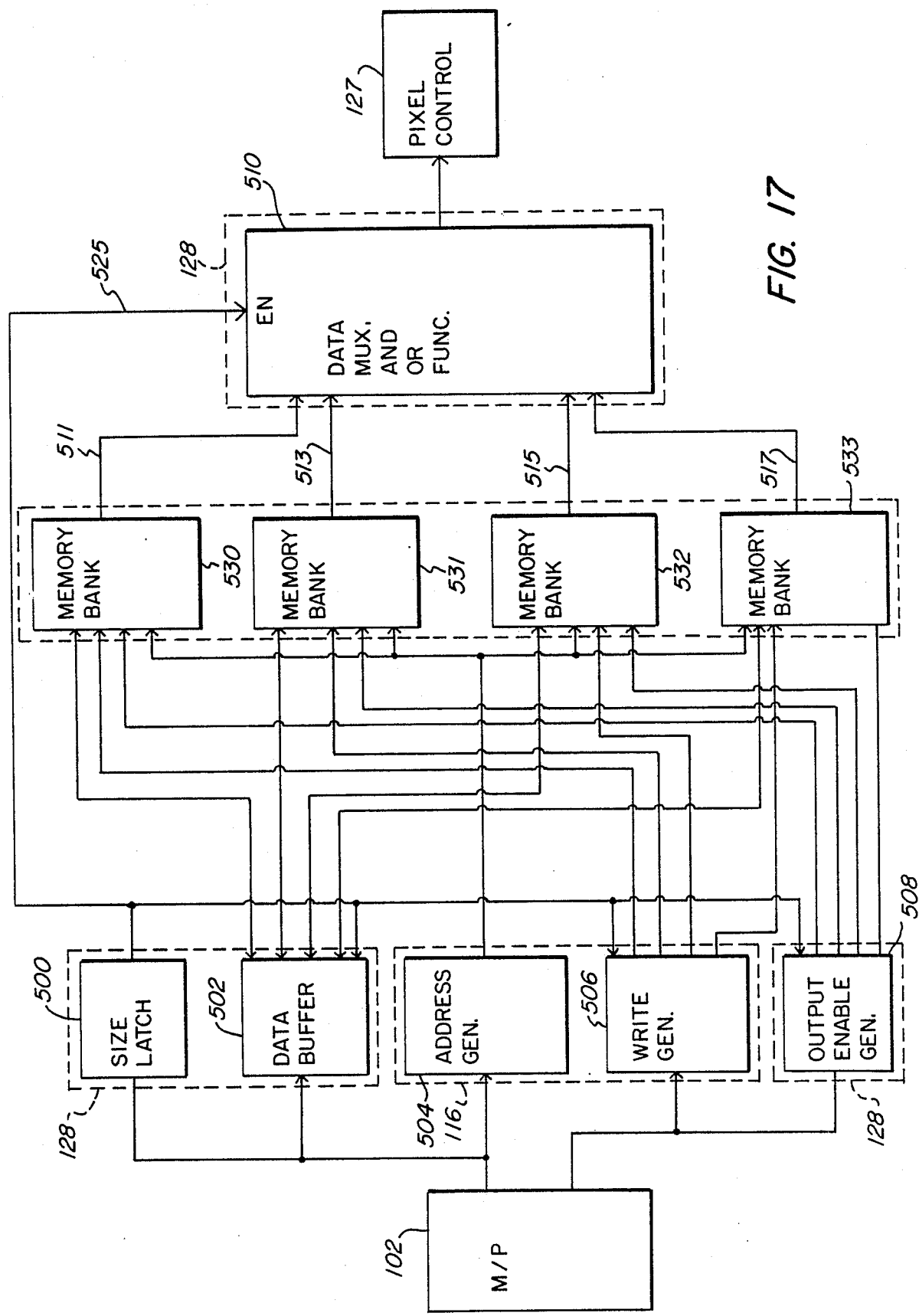

SYSTEM FOR STORING AND RETRIEVING TEXT AND ASSOCIATED GRAPHICS

BACKGROUND OF THE INVENTION

The invention relates generally to computerized systems for storing and retrieving document text, worksheets and associated graphics. The invention relates more particularly to such systems which automatically index a variety of graphics relating to a document or text, allows an operator to conveniently and rapidly select the graphics for display, rapidly displays the selected graphics, and allows the operator to rapidly and conveniently select portions of the displayed graphics to be enlarged and centered. The invention also relates to such systems which estimate the cost of repairs and display repair procedures.

Various types of systems for storing and retrieving document text, worksheets and associated data and graphics were previously known. For example, text, menus and graphics have been stored in computer memory and displayed in separate windows on a screen. Controls have also been provided to scroll the windows up, down, left and right and thereby, display different portions of the text, menu and graphics.

Book information has also been stored in computer memory to facilitate layout of the book. Text of the book and reference numbers indicating the location of associated graphics are stored together in memory. When combined, the graphics are displayed integral with the text, that is, portions of pages of the text are devoid of text and filled instead with graphics.

Previously known systems are also capable of enlarging graphics. In one such system, a non-enlarged graphic image is displayed, and a relatively small selection box is superimposed thereon. By means of left, right, up and down control keys, an operator can move the box over any portion of the image. Then, by pressing another control key, the portion of the image under the box is centered on the screen and the image is enlarged.

In another previously known system, a mouse or cursor is superimposed on a graphic image and moved to a desired location by an omnidirectional control. Then, by pressing a control key, the portion of the image under the mouse or cursor is centered on the screen and the image is enlarged.

Despite the advantages of centering and enlarging the graphics provided by these two previously known systems, it is cumbersome to make the selection by either the control keys or omnidirectional control.

The foregoing graphics have been stored electronically in computer memory either in compressed or non-compressed form. In non-compressed form, data individually defining each pixel of the graphic image is stored. While this technique allows rapid display of the graphics, it requires a relatively large memory to store the data because each image has thousands of pixels and typically, there are many graphic images required for each system. A variety of techniques such as run-length encoding were previously known to compress video data so that a relatively small amount of data need be stored to represent each graphic image. However, when an operator selects a particular graphic image for viewing, the computer requires a perceivable time to decompress the data for display, and this is undesirable in some applications.

In the automotive repair industry, service manuals have been used to instruct a mechanic how to perform a repair. However, the manuals are cumbersome to use especially in a shop environment because the mechanic may need to search throughout the manual for information and graphics helpful to perform the necessary repair. Also, because of size constraints, manuals do not include satisfactory enlargements of every image.

Heretofore, manuals have also been relied upon to estimate the cost of repairs. An estimator views the damaged vehicle, and determines either through observation or a parts manual, the parts which are damaged. Then, the operator estimates the cost of repair by looking-up in a manual the cost for each of the damaged parts and the specified time for repair. This procedure has also proven cumbersome because more than one manual may be required to make the estimation, and after the initial write-up, the information may have to be transcribed into another form. Also, the operator may not notice every damaged part.

Automatic Data Processing, Inc. ("ADP") has previously sold a hard copy insurance estimation system. To utilize the system, a user identifies the model of a damaged vehicle and then, locates in a file cabinet a hard copy multi-worksheet form corresponding to the model. The worksheet includes several different views of the model, part numbers, and lines leading from the part numbers to the corresponding parts. The multi-worksheet also includes work space for entry of administrative information. The user circles the numbers of the damaged parts and then, a computer operator electronically transmits the part numbers to a central computer which estimates the cost of repair. The identification of the damaged parts, the storage of all the forms, and the requirement for entry of the part numbers into electronic form for transmission to the central computer has proven cumbersome and prone to error.

The ADP system also includes on the multi-worksheet, a portion similar in appearance to FIG. 14 by which the user circles a code number indicating the point of impact. The computer operator also transmits the code number to the central computer for statistical purposes only.

A general object of the present invention is to provide a convenient, effective, electronic service manual, insurance estimating system or other such system.

Another general object of the present invention is to provide a system for storing and retrieving document text, worksheets and associated data and graphics, which system automatically indexes a variety of graphics relating to a document and permits convenient and rapid selection and display of the associated graphics.

A more specific object of the present invention is to provide a system of the foregoing type which does not require a large memory for storage of the graphic images in relation to the number of images which are stored.

Another general object of the present invention is to provide systems of the foregoing type in which graphic images displayed on a screen can be more conveniently enlarged and centered about a desired point than in the prior art systems.

SUMMARY OF THE INVENTION

The present invention resides in apparatus and processes for storing and displaying documents and associated graphic images in insurance estimation, service manual and other systems.

According to one feature of the invention, the system stores a multiplicity of documents in digital form and a multiplicity of graphic images in compressed, digital form. A first group of the graphic images are associated with a first one of the documents. By selecting the first document, the system automatically decompresses the first plurality of graphic images. The system then displays at least a portion of the selected first document on a display screen along with a first one of the decompressed graphic images. Subsequently, upon user command, the system displays a second one of the decompressed documents. Because the second graphic image was decompressed when the document was selected, there was virtually no delay in displaying the second graphic image.

The document includes reference numerals imbedded therein which identify the associated graphic images so that when the document is selected, the system can determine which graphic images should be decompressed.

According to one feature of the present invention, the second graphic image is selected by means of a touch screen overlaying the video display so that the second selection and display are made easily and rapidly.

In the service manual system, the document comprises text describing steps for repairing a vehicle and the graphic images illustrate portions of the vehicle under repair corresponding to the text.

According to another feature of the invention, the graphic image can be enlarged and centered about or near a point on the screen which is touched.

In the insurance estimation system, the system displays a graphic image of a vehicle or other object. By means of a touch screen, damaged parts are identified. A local or remote processor determines the cost of correcting the damage of the identified parts.

According to one feature of the insurance estimation system, a first one of the graphic images is a view of the vehicle as a while, and the control means is responsive to a touch on the touch screen for displaying a second, more detailed graphic image corresponding to a damaged region indicated by the touch. Alternately or in conjunction with the first graphic image, the system may display a menu for identifying a variety of graphic images corresponding to the damage area.

BRIEF DESCRIPTION OF THE FIGURES

FIG. 1 also illustrates outside of the broken line steps for programming the system to implement a particular process.

FIG. 14 is a plan view of a graphic image displayed by the system of FIG. 1 in accordance with the insurance estimation program of FIG. 12.

FIG. 15 is a graphic image identified with the aid of the menu of FIG. 13 and/or the graphic image of FIG. 14 and used to specify damaged parts.

FIG. 17 is a block diagram of electronic components within a bus interface, memory controller and memory of FIG. 8.

DETAILED DESCRIPTION OF THE PREFERRED EMBODIMENTS

Figures 1, 2:
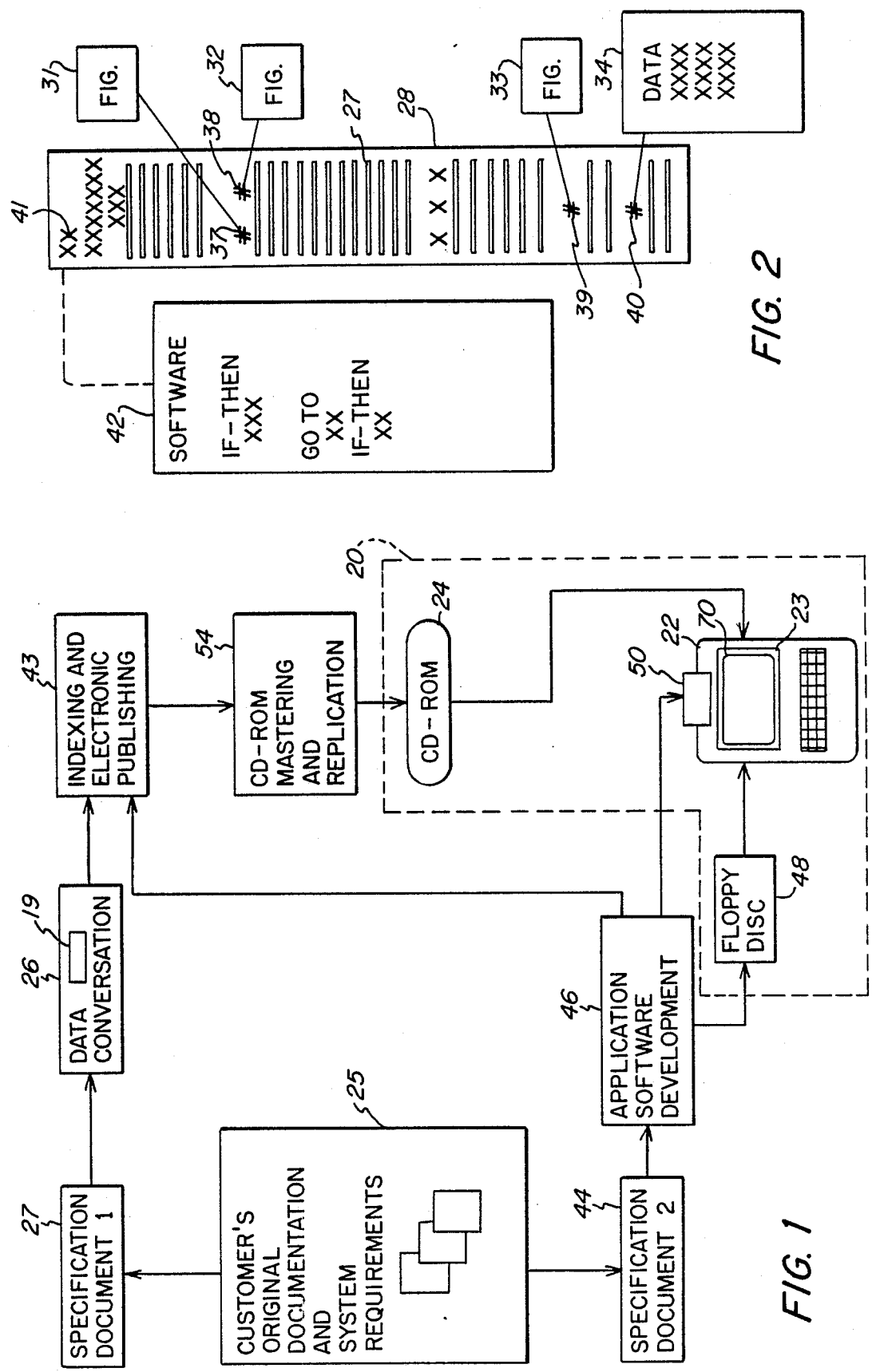
FIG. 1 is a block diagram illustrating in broken line a system for storing and retrieving document text and associated graphics according to the present invention.
FIG. 2 is a schematic diagram of the layout in electronic memory of document text, reference numerals imbedded therein, and associated graphics, data table and software routine addressed by the reference numbers. The text, graphics, data table and software routine may be stored on CD-ROM within the system of FIG. 1.

Turning now to the figures in detail wherein like reference numerals indicate like elements throughout the several views, FIG. 1 schematically illustrates a multidocument storage and retrieval system generally designated 20 in accordance with the present invention. The system 20 includes a computer terminal 22 which includes a screen 23 for displaying text, graphics, data and worksheets associated with each document and stored on a CD-ROM 24. By way of example, screen 23 is a 640×400 liquid crystal display Model BF642F93 manufactured by Seiko Instruments U.S.A., Inc. This model provides a minimum brightness of 50 cd/$M^2$ with a contrast of 1:10. The nominal refresh rate is 60 HZ.

FIG. 1 also illustrates the steps in programming the system 20. In step 25, the user furnishes information defining text and associated graphics and data of a particular application. For example, in a service manual application, the text includes a description of many different repair procedures. The graphics include different views of a vehicle or other object under repair. The data includes tables such as parts' lists. In an insurance estimation function, the data includes the names of models of vehicles or other objects under repair, parts lists and costs, and the graphics include different views of the vehicle or other object being repaired.

Then, in step 27, specifications for the application are developed. The specifications include composition requirements such as pagination, layout and new or existing relationships that the user wishes to establish between sections of the document, menu selections, graphic to text or data links, and other links as described in more detail below. The information according to the specifications is then input to another computer terminal 19 where it may be stored on computer tape (step 26). If the information is originally in hard copy form, then it may be entered into computer 19 by an associated keyboard or sheet reader (not shown), and if the information is originally stored electronically, then it may be transferred electrically into computer 19. In either case, the information is stored in ASCII or such code. Then the pages or sections of the document and worksheets are composed, and index files and other relationships established as illustrated in FIG. 2 (step 43).

Text 27 for one logical section of a document such as a description of a procedure for repairing one defective part is grouped together in a single, long "hyperpage" 28, but separated from associated graphics 31–33 and data table 34. At locations in the text which correspond to the associated graphics and data table 31–34, respectively, reference numbers 37–40, respectively, are entered in the text stream.

A reference number 41 may also be imbedded at the beginning of hyperpage 28 to call-up a special software subroutine 42. However, as described in more detail below, one software routine may be provided to utilize many hyperpages 28 of text and associated data and graphics and referenced otherwise so that this reference and subroutine may not be necessary.

A block of information defining each graphic image 31–33 is compressed and stored in computer 19. Similarly, a block of information defining data table 34 and an optional block of information defining software subroutine 42 may also be stored in the computer 19 memory. Multiple software subroutines such as 42 may also be provided and accessed for one procedure and, if desired, different hyperpages can share the same software subroutine. The reference numbers 37–41 indicate the present locations in computer 19 memory and the subsequent locations in CD-ROM 24 of the corresponding blocks of information defining the graphic images 31–33, data table 34 and optional software routine 42, respectively. Thus, text and the associated graphics, data and optional software routine are linked to one another by the reference numbers. For example, if one hyperpage of text relates to a particular automobile repair procedure, the text may be linked to graphic diagrams of the portion of the automobile having the part to be replaced and the surrounding parts which provide access to the defective part. The data table may provide the manufacture and part number of the defective part, and the software subroutine may inform the user that if he or she repairs or replaces a part such as a lower ball joint, then he or she must also perform a related service such as a front wheel alignment.

In step 43 of FIG. 1, index files are also generated to provide menus which locate and access desired hyperpages. There may be thousands of text hyperpages and associated graphics and data tables stored on CD-ROM 24, and system 20 provides a hierarchical indexing system 198 illustrated by FIG. 3. A top level menu 200 presents a few, for example three, broad categories of repair within boxes 201–203. The user can select any of the three possibilities by either a keyboard entry or touch within the box as described in more detail below. Each of the selections 201–203 is linked to a lower level menu 204–206, respectively, which provides more detailed information about the linked hyperpages. Menu 200 may include, for example, in selection box 202, "front end", and corresponding menu 205 may list "upper ball joint", "lower ball joint", "front upper suspension arm" and "front lower suspension arm." Each of the selections from the lower level menu 205 is linked to a corresponding hyperpage. Hyperpages 207–210 were listed on menu 205. For simplicity, the other hyperpages linked to menus 204 and 206 are not illustrated in FIG. 3.

Referring again to FIG. 1, in step 44, specifications are provided to define the functional requirements of the software for system 20. In step 46, an operator develops a main application specific software based on the specifications. The software is used to retrieve and present the text, worksheets, graphics and data and perform computations according to the desired application and commands entered into the terminal 22 by a user, and is described in more detail below with reference to FIGS. 7 and 12. The software is stored in either of three ways, on a floppy disk 48, in PROM 50 within terminal 22, or on the CD-ROM 24 by prior entry into computer 19 with the document during step 43. If desired, the optional software routine 42 may also be stored on floppy disc 48. By way of example, floppy disc 48 is a Sony Model MP-F83WOOD with a 3.5" diameter and 1.44 megabyte capacity.

In step 54, the text 27, graphics 31–33, data table 34, optional software subroutine 42 and main software program (if destined for the CD-ROM) are written from the computer tape onto the CD-ROM 24. Although not illustrated in FIG. 2, data defining optional worksheets generated in step 27 are also written onto the CD-ROM.

Figure 4:
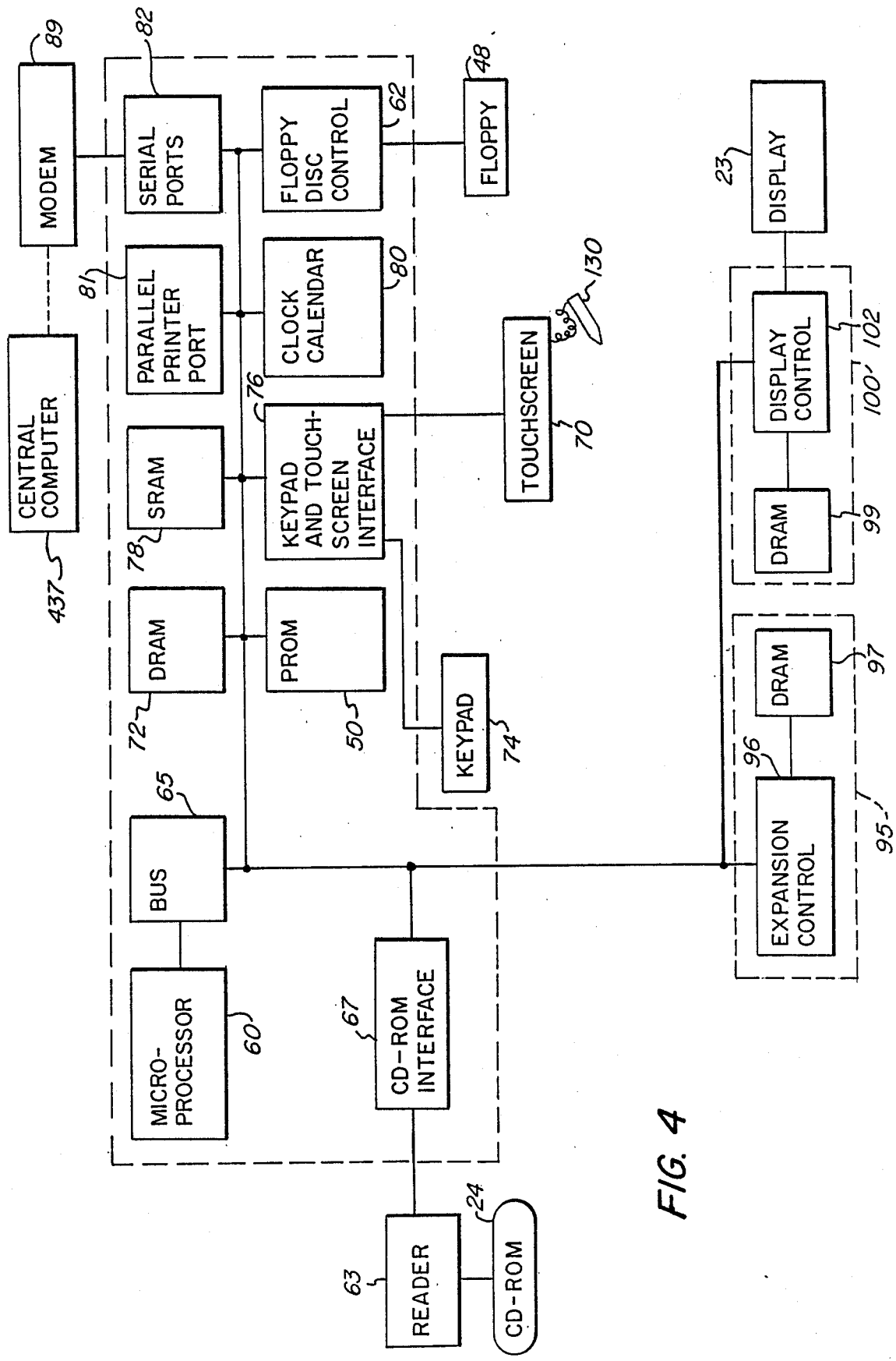
FIG. 4 is a schematic block diagram of components of the system of FIG. 1 and their basic interconnections.

The basic components of computer terminal 20 are schematically illustrated in FIG. 4. Terminal 20 includes a master microprocessor 60 which implements the main software routine stored on either CD-ROM 24, PROM 50 or floppy disk 48. By way of example, microprocessor 60 is Model 80C88 manufactured by Harris Corporation. Microprocessor 60 communicates with the remainder of the system via a bus 65 which, by way of example, is Model FE2010 manufactured by Faraday Electronics and/or Western Digital Company. Microprocessor 60 reads the software if stored on disk 48 with the aid of disk drive and control 62, and if stored on CD-ROM 24 with the aid of CD-ROM reader 63 via CD-ROM interface 67. In either case, the software may be downloaded into dynamic random access memory (DRAM) 72 which by way of example has a 640K byte capacity.

Figure 5:
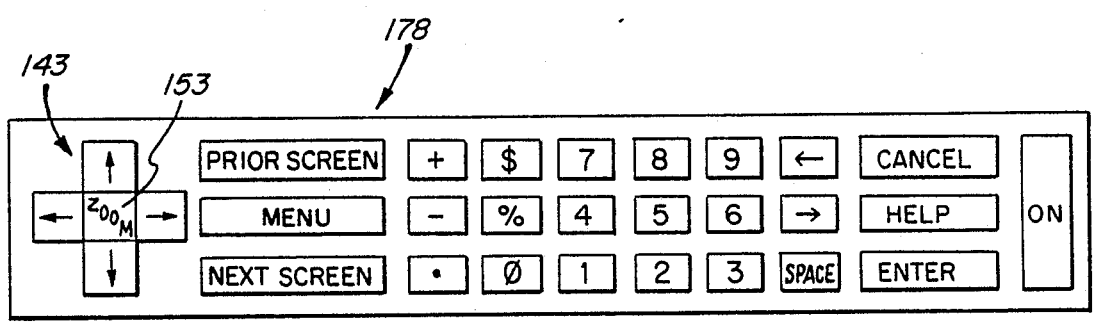
FIG. 5 is a plan view of a keypad of the system of FIG. 1.

A membrane keypad 74 illustrated in FIG. 5 allows a user to initiate a program by suitable entry. The entry is read by microprocessor 60 with the aid of keyboard and touch screen interface 76 via bus 65 which interface encodes the keyboard entry. A transparent touch screen 70, illustrated in FIG. 1, overlays the display screen 23. By way of example, the touch screen is a resistive touch screen manufactured by Microtouch Systems, Inc. of Massachusetts, U.S.A., and is capable of resolving the 640×400 display pixels. Referring again to FIG. 4, the location of the area touched is decoded as follows. A voltage is applied to one side edge of the touch screen and the opposite side edge is grounded. Wand or stylus 130 is connected to the input of an A/D converter (not shown). The touch screen is resistive so that the voltage at the point of touch corresponds to the location between the aforesaid side edges. Next, the voltage is applied to one of the other perpendicular side edges and the opposite side edge is grounded to determine the location between these two side edges. Software previously loaded into PROM 50 from either CD-ROM 24 or floppy disk 48 controls this decoding operation. The decoded information is transmitted to microprocessor 60 via bus 65. Thus, the user can make selections and commands relating to text, worksheets, graphics and data displayed on screen 23 by either keypad 74 or touch screen 70.

A static random access memory (SRAM) 78 stores calibration constants representing the alignment of the touch screen relative to the display screen and other information described below.

An electronic clock and calendar module 80 is also provided to assist system 20 in generating reports. A parallel data port 81 provides communication with a printer and serial data ports 82 provide communication with a central computer 437 via a modem 89.

Figure 6:
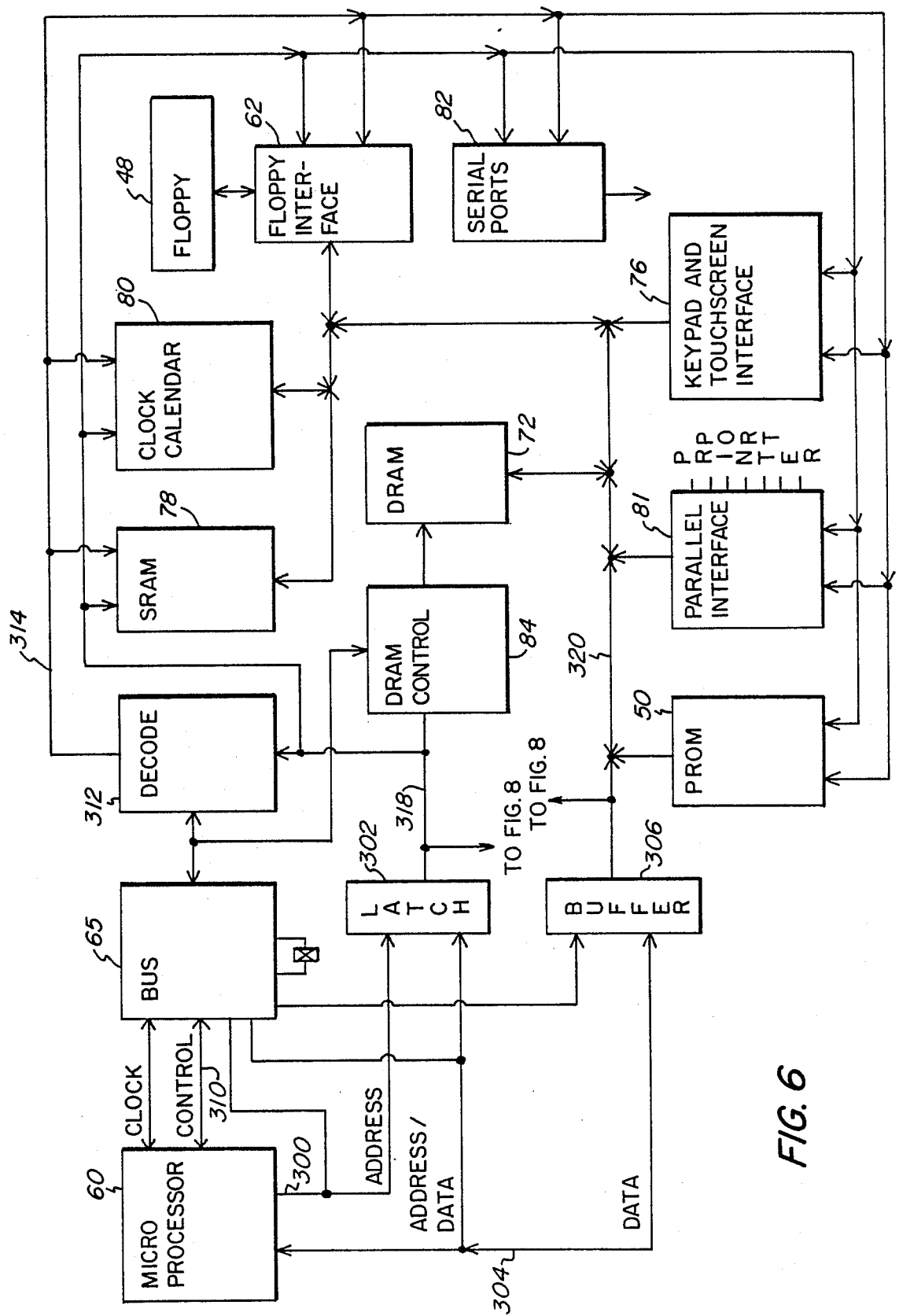
FIG. 6 is a schematic block diagram of some of the components of FIG. 4 and shows the interconnections between the components in more detail as well as additional related components.

Communication channels between the foregoing elements of system 20 are illustrated in more detail in FIG. 6, along with additional related components. To transmit data, microprocessor 60 transmits via lines 300 an address of the destination component to bus controller 65 and latch 302. Microprocessor 60 also transmits the data via lines 304 to buffer 306, and a write command via line 310 to bus 65. An address decoder 312 transmits corresponding enable signals to the destination component via lines 314. Then the destination component reads the address at which the data should be stored from latch 302 via bus or lines 318 and then reads the data from buffer 306 via bus or lines 320.

To read data, microprocessor 60 transmits the address of the source component to bus controller 65 and latch 302, and a read command on line 310 to bus controller 65. In response, address decoder 312 transmits corresponding enable signals to the source component via lines 314. Next, the source component reads the address at which the data should be read from latch 302 via lines 318, and then transmits the data into buffer 306 via lines 320. Microprocessor 60 reads the data from buffer 306.

FIG. 4 also illustrates an image decompression board 95 comprising a dedicated processor 96 and an associated DRAM 97 providing work space for the decompression process. By way of example, board 95 is a Model TMS-34010 manufactured by Texas Instruments of U.S.A. As described in more detail below, with reference to FIG. 7, decompression board 95 decompresses the graphic image data stored on CD-ROM 24 or floppy disk 48, and transmits the decompressed data to a DRAM 99 for storage within a graphics controller board 100. In the decompressed form, data defining each pixel for the screen provides a one-to-one mapping and capability for instantaneous display. A graphics controller processor 102 on board 100 controls the transfer of the decompressed graphics data to screen 23.

Figure 7:
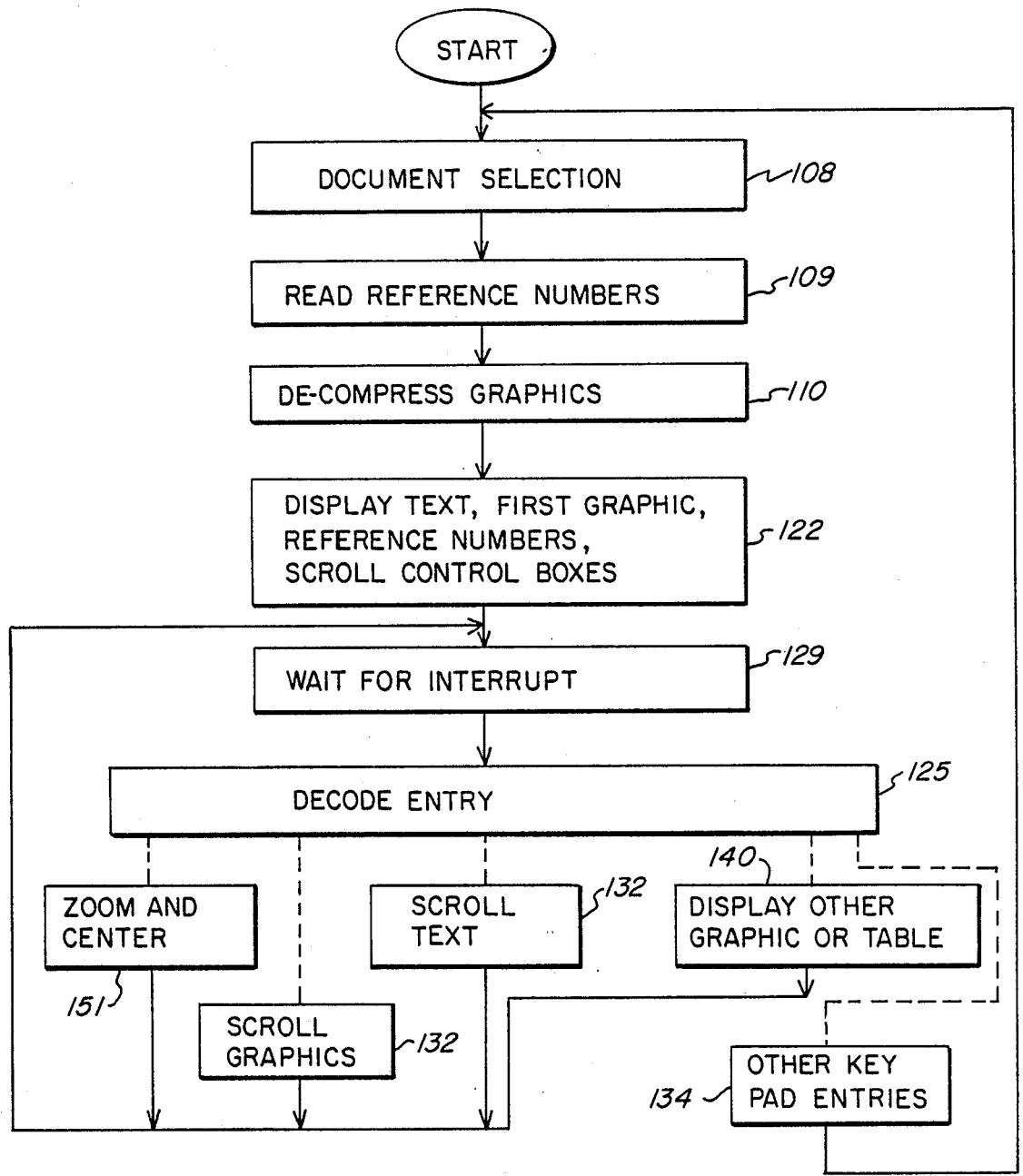
FIG. 7 is a flow chart illustrating the operation of a main microprocessor within the system of FIG. 1, which microprocessor has been programmed to implement a service manual application.

FIG. 7 is a flow chart illustrating the utilization of system 20 is an electronic service manual application. However, it should be understood that system 20 can be programmed to implement a wide variety of processes. Initially, a user may request via keypad 74 the menu 200 of repair procedures contained within CD-ROM 24.

After selecting from this menu by touch-screen 70, either menu 204, 205 or 206 is displayed. After selecting from one of the latter menus, a document such as the one including hyperpage 28, graphics 31–33 and data table 34 defining the selected repair procedure is identified (step 108).

Figure 3:
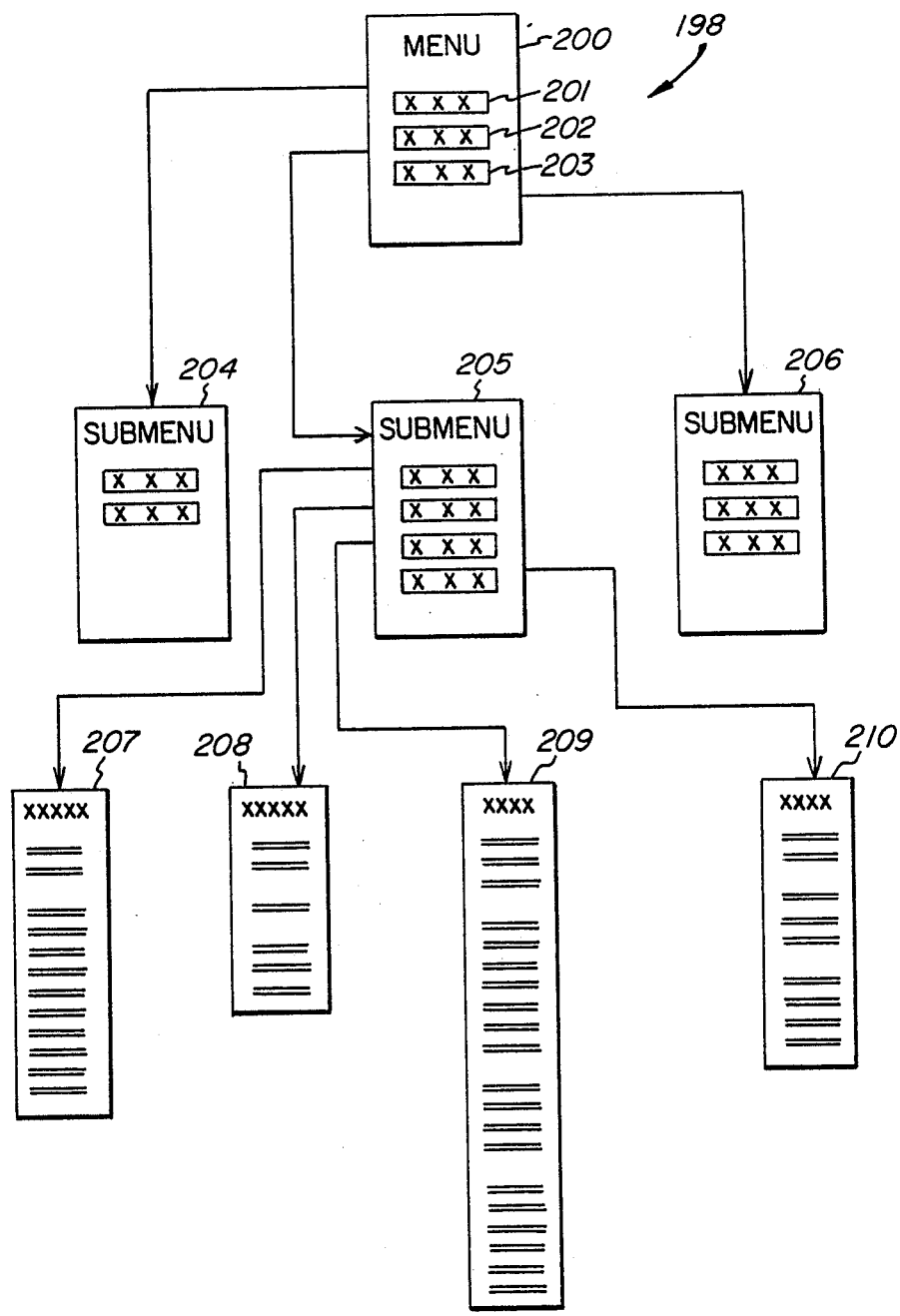
FIG. 3 is a schematic diagram of a three-tiered, hierarchical indexing or menu system to access the document of FIG. 2 and other documents within the system of FIG. 1.
Figure 16:
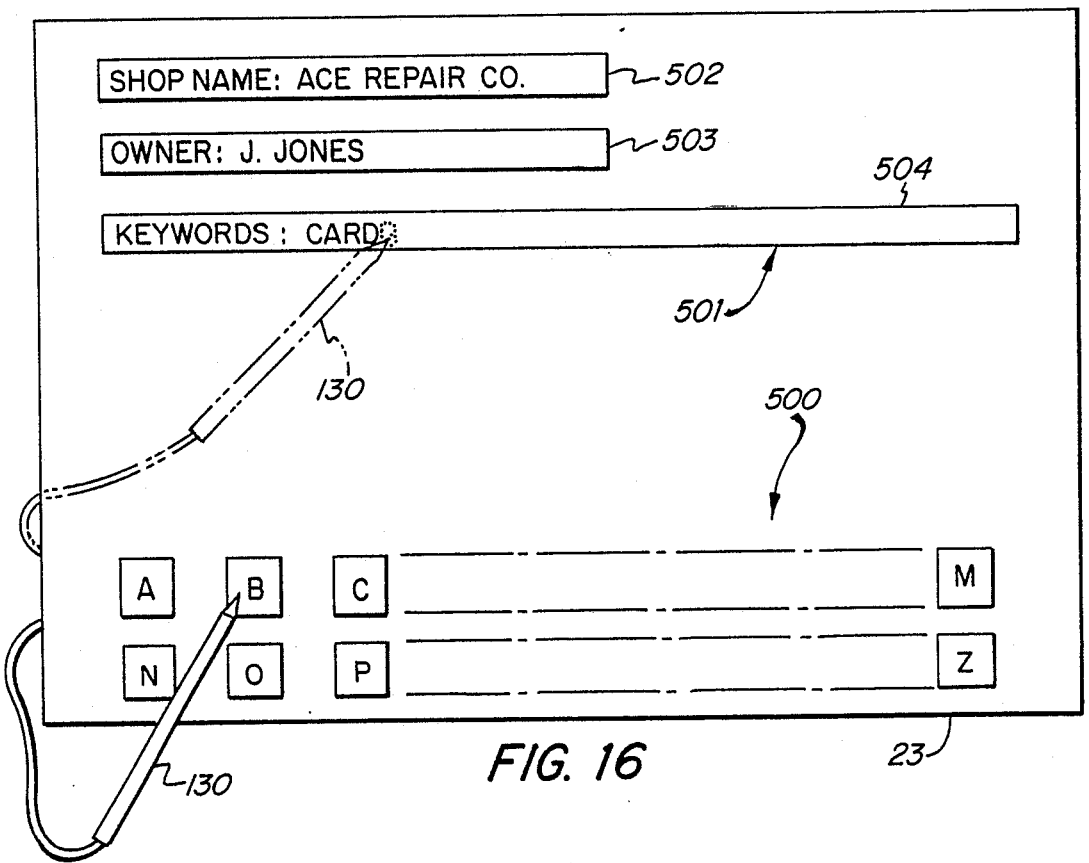
FIG. 16 is a worksheet displayed by the system programmed according to FIG. 12 and illustrates the entry of alphabetic information.

In addition to utilizing the menus 200 and 204–206 illustrated in FIG. 3, microprocessor 60 is optionally programmed to read in step 108 key words to locate one or more hyperpages which contain some or all of the key words. The key words may be input through a keyboard 500 which is displayed on screen 23 as illustrated in FIG. 16. To display keyboard 500, data defining keyboard 500 and worksheet 501 was downloaded from CD-ROM 24 into DRAM 22 at the time that the document was identified. To utilize the keyboard 500, first one of selection boxes 502, 503 or 504 is selected by a touch with stylus or wand 130. To permit keyboard to fit on the screen, the normal distance between adjacent rows of lettering may be reduced by eliminating one or more of the intervening blank raster lines. Microprocessor 60 reads the location of the touch from interface 76, and based on decoding software stored within PROM 50 correlates the touch with the category within the box in order to read and display the information in each category. For example, as illustrated by broken-line in FIG. 16, the user touched box 504 after completing boxes 502 and 503. After touching box 504, microprocessor 60 is programmed to display the subsequent letters in box 504 and to treat the letters as one or more key words. Then the user successively touched letters "C", "A", "R" and "B" to begin spelling the first key word "carburetor." The user may then enter the remainder of the key word "carburetor", and other key words such as, "Cadillac", "V-8/450HP", "fast idle" and "poor acceleration" in order to access a procedure for making the necessary repair. Thus, this indexing scheme diagnoses the problem as well as accesses textual and graphic information necessary to make the repair. As further illustrated in FIG. 16, keyboard 500 was previously used to enter the name of the repair shop by touch of box 502 followed by touch of the letter boxes on keyboard 500 which spell the repair shop "ACE REPAIR CO.". Similarly, the name of the owner of the vehicle "J. JONES" was also entered by touch of box 503 and then boxes on keypad 500.

Figure 8:
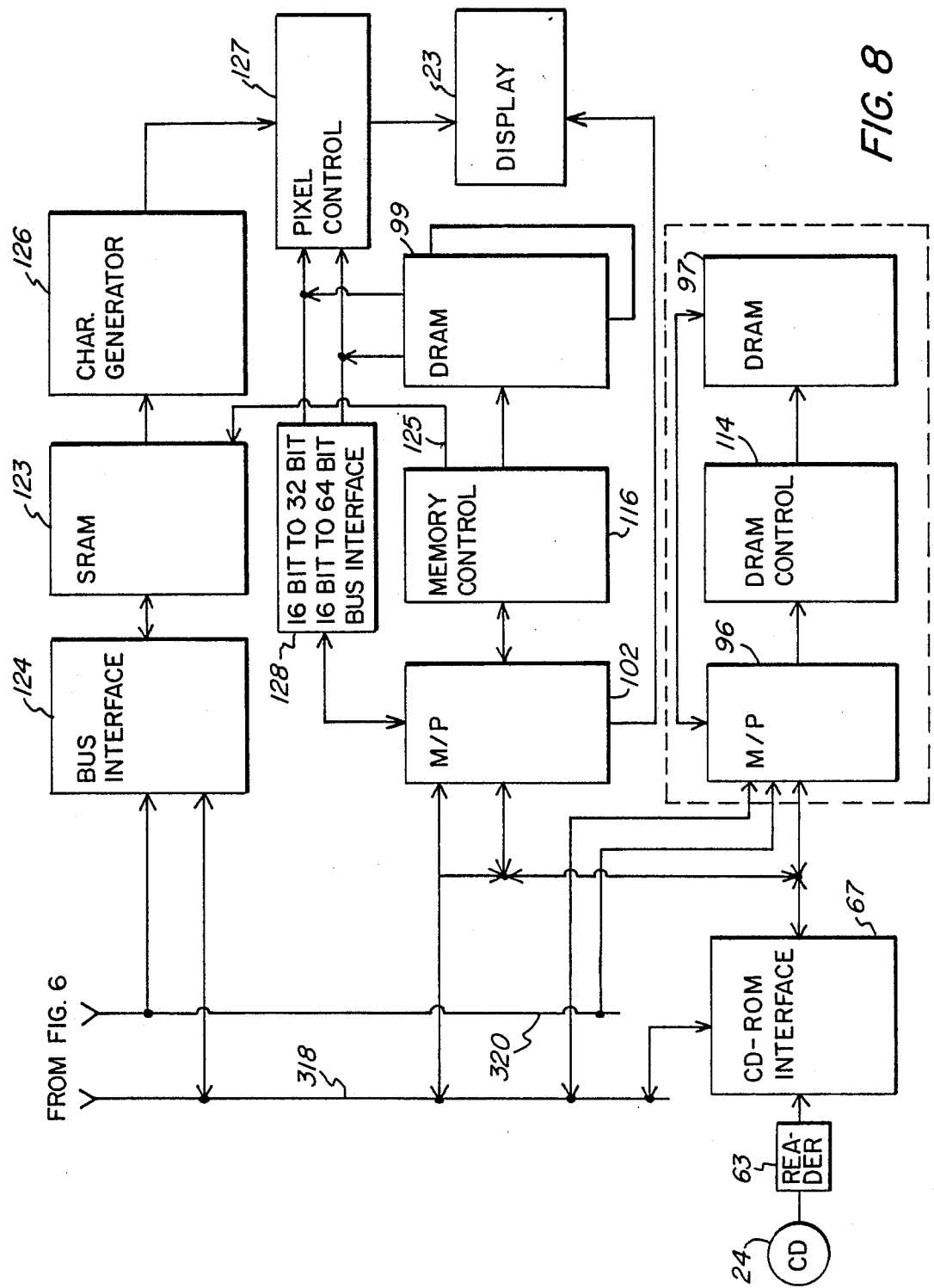
FIG. 8 is a schematic block diagram of other components of FIG. 4, and shows the interconnections between the components in more detail as well as related components.

Referring to FIGS. 7 and 8, after the document selection, microprocessor 60 transmits a sector address to CD-ROM interface 67 via bus 320 to locate the selected document, and afterwards reads all the reference numbers within the document identifying all the graphic images within the selected document (step 109). Then CD-ROM reader 63 accesses the graphic information under the control of processor 60, which processor then extracts header information defining the size of the image and each region on the screen 23 which forms a touch pad as described in more detail below. The header information is stored in DRAM 72. Then, in step 110, decompression processor 96 reads the compressed graphic data of the selected document from CD-ROM 20 via interface 67 and decompresses the data with the aid of workspace DRAM 97 and DRAM controller 114. Then, processor 96 transmits the decompressed graphic image data to graphic control processor 102 for storage in DRAM 99 with the aid of memory control 116. Memory control presents the addresses specified by microprocessor 102 to DRAM 99 in two parts in two different cycles. One part specifies a column and the other part specifies a row. Data is read from DRAM 99 similarly in two cycles (DRAM control 114 operates similarly upon DRAM 97). By way of example, CCITT Group IV run length encoding was used to compress the data originally written into CD-ROM 24 and processor 96 implements corresponding run length decoding in the decompression process. Thus, all the graphic image data in decompressed form associated with the selected document is available from DRAM 99 for instantaneous display on screen 23. This satisfies one object of the invention in that the size requirement for CD-ROM 24 is minimized because it stores graphic image data of hundreds or thousands of graphic images in compressed form, and at the time a procedure is identified, only the graphic images associated with the selected procedure are decompressed and stored in DRAM 99 for instantaneous display.

Figure 9:
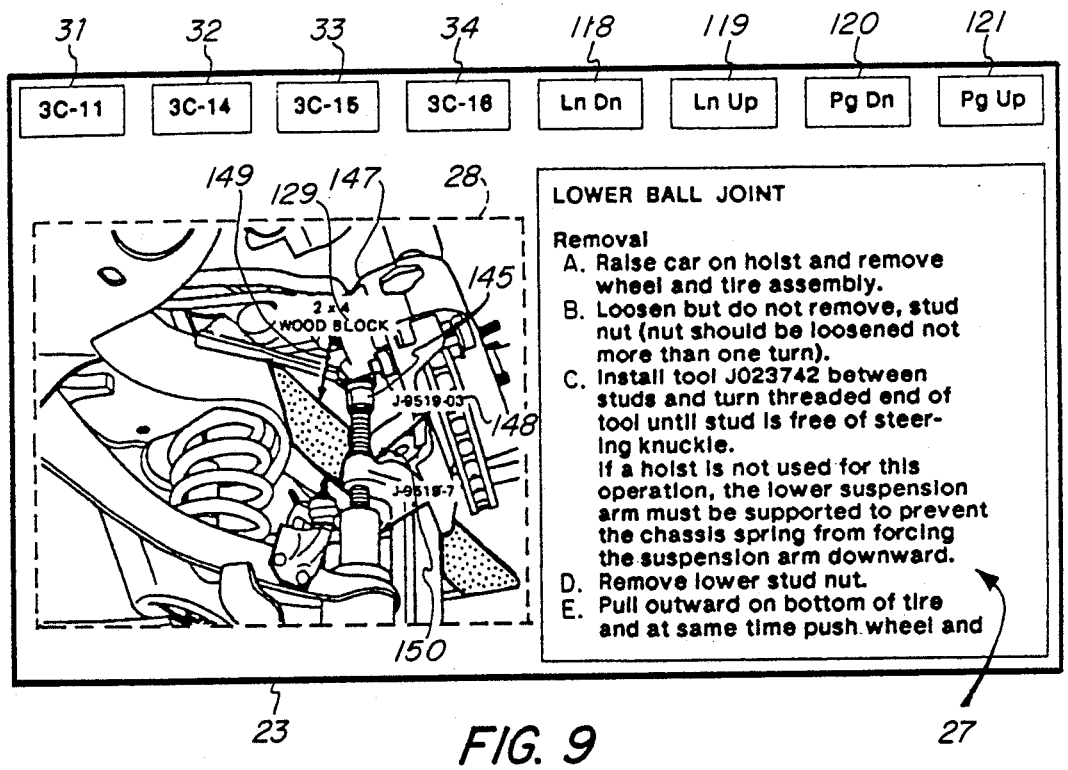
FIG. 9 is a plan view of a screen of the system of FIG. 1 displaying a portion of document text and associated graphics for a service manual application.

Next in step 122, microprocessor 60 causes a first portion of the document text 27, the first referenced graphic image 31, reference numbers 31-34, and text scrolling control symbols 118-121 to be displayed on screen 23 as illustrated in FIG. 9. To do this, microprocessor 60 transmits the address of the text to CD-ROM reader 63 via bus 320 and interface 67. Then, a portion of the text is read into SRAM 123 via interface 67 and text bus interface 124. The processor 102 then determines the amount of text which will fit on screen 23 at one time, and memory controller 116 addresses the text in SRAM 123 via lines 125. The addressed text is transformed into actual alpha numeric characters by a character generator 126. A pixel controller 127 combines the text character data with decompressed graphic data received from DRAM 99. In the illustrated embodiment of system 20, the alphanumeric information within each of the images such as label 129 is stored and retrieved as graphic information. However, the data table 34 in addition to text 127 is stored and retrieved as text.

Interface 128 selects sixteen pixels of data from either 16, 32 or 64 pixels of data stored in DRAM 99 in accordance with a zoom level of the image. The image presented in step 122 fills window 61 of screen 61, and ordinarily DRAM 99 contains four times the detail and data necessary to fill the window at the zoom level indicated in step 122. Pixel controller 127 is designed to combine sixteen pixels of graphic data with the text from character generator 126, so that bus interface 128 under the control of processor 102 presents the sixteen pixels of graphic data simultaneously to control 127. However, as described below with reference to FIG. 17, ordinarily in step 122, interface 128 extracts sixteen pixels of data from DRAM 99 by ignoring the second and fourth pixel in both the X and Y directions and performing an "OR" function on the first and third pixels of every group of four pixels. The result is one pixel of data for every four pixels stored in DRAM 99 but the one pixel contains information from every other bit in the group so it will not miss a line.

To implement step 122, microprocessor 102 transmits image size data (1:4) to size latch 500 within interface 128 as illustrated in FIG. 17. Size latch 500 latches the size data for subsequent control of a data buffer 502, write generator 506 and output enable generator 508 within interface 128, and data multiplexor and OR function logic 510 within interface 128. Data buffer 502 controls the routing of data from microprocessor 102 to each of four memory banks 530-533 within DRAM 99 and vice versa. Next, microprocessor 102 transmits the addresses of the graphic image data to address generator 504 within memory control 116, a write command to write generator 506, and an output enable signal to generator 508. Generator 508 enables the corresponding memory bank within DRAM 99. Thus, the data is written into DRAM 99 via data buffer 502. In the 1:4 zoom-out mode of step 122, all of the memory banks output their data simultaneously to logic 510 which performs the OR function on the first and third pixels of each group of four and the elimination of the second and fourth pixels to yield a total of sixteen pixels of data which are transmitted simultaneously to pixel control 127. Logic 510 is illustrated in more detail in FIG. 18 in fragmentary form. Data is supplied on sixteen lines 511 to logic 510 although, for simplicity, only eight of the lines 511 are shown. In addition, each of the other memory banks 531-533 also supply sixteen pixels of data on sixteen lines 513, 515 and 517, respectively, although all lines are not shown. The first and third pixel of each group of four are supplied to an OR gate 520, and the outputs of the OR gates 520 are supplied to 1:4 buffer 524. Similarly, the outputs of the OR gates associated with the data input via lines 513, 515 and 517 are supplied to other OR gates 520 which output to other buffers 524 (not shown). In the step 122, the 1:4 buffers 524 are enabled so that in total sixteen pixels of data are supplied simultaneously to pixel control 127, and the 1:4 zoom-out mode is implemented.

The text portion 27 is displayed in a righthand portion of screen 23 and includes a title "Lower Ball Joint", subtitle "Removal" and a body describing a procedure for removing a lower ball joint. The remaining portion of the procedure is not displayed at this time because it cannot fit on the screen. The graphic image 31 is displayed separate from the text to allow independent enlarging and scrolling of the graphic image and independent scrolling of the text.

In addition to displaying the text and graphics on screen 23, microprocessor 60 also causes the display of text line-down, line-up, page-down and page-up control boxes or touch pads 118-121 respectively by addressing the coresponding data from DRAM 72, and writing the data into static random access memory (SRAM) 123 via bus interface 124. These control boxes control the scrolling of the text either line-by-line or page-by-page. To institute such control, the user simply touches the appropriate control box with the wand 130.

FIG. 9 also illustrates that reference numbers 31-34 are displayed above graphic image 31 in boxes or touch pads on screen. These numbers were extracted from the document text in CD-ROM 24.

Figure 10:
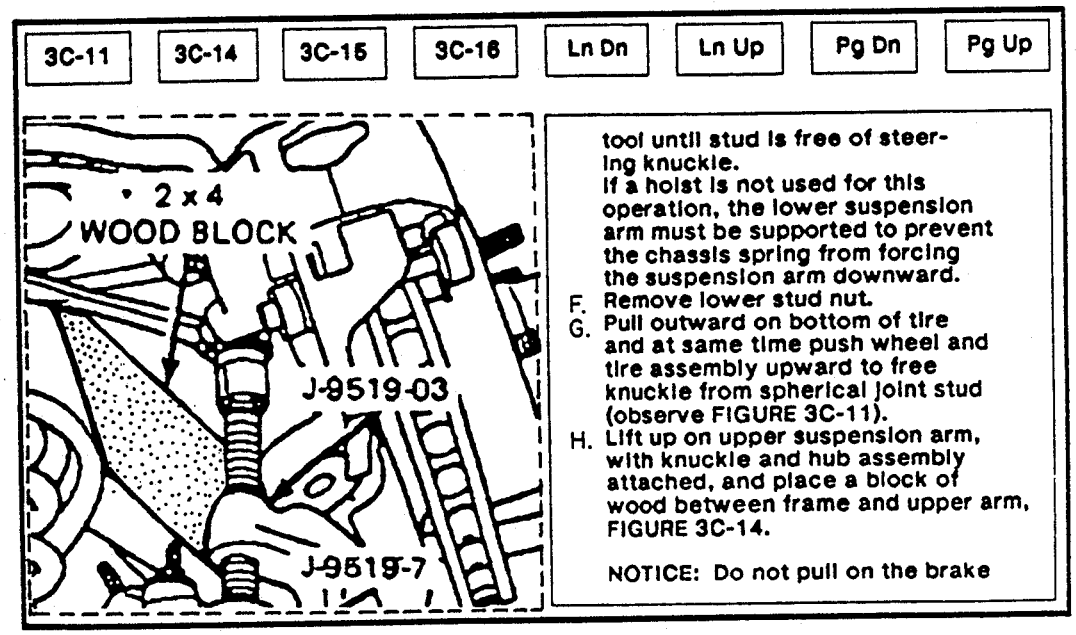
FIG. 10 is a plan view of the screen of FIG. 9 with the document text scrolled downwardly and the graphic image enlarged and centered about a new point.

Next, according to the flow chart of FIG. 7, microprocessor 60 waits for an interrupt indicating an entry either through keypad 74 or touch screen 70 (step 129). Upon receipt of the interrupt, microprocessor 60 reads interface 76 to determine the nature of the entry (step 125). If one of the text scrolling control boxes has been touched, microprocessor 60 jumps to a scrolling subroutine stored in DRAM 72 and scrolls the text by transmitting successive (or prior adjacent) addresses to reader 63 and thereby accessing the text in CD-ROM 24 at successive (or prior) locations (step 132). FIG. 10 illustrates the text 27 after it has been scrolled several lines so that another portion is displayed. After such scrolling, microprocessor 60 returns to step 129 to await another interrupt.

When the next interrupt is received, microprocessor 60 reads interface 76 to determine the corresponding subroutine. If one of the graphic selection boxes has been touched by wand 130 (step 140) corresponding to reference numbers 32 or 33, microprocessor 60 directs display processor 102 and memory controller 116 to display the selected graphic image on screen 23 by memory controller 116 addressing the corresponding locations in DRAM 99. It should be noted that the display of a different graphic image is virtually instantaneous because the image data in DRAM 99 is stored in decompressed from, which decompression was implemented in step 110. Then, microprocessor 60 returns to step 129.

If the user now touches the selection box associated with data table 34, microprocessor 60 reads the address of the corresponding information in CD-ROM 24, and the information is read into SRAM 123 via interfaces 67 and 124 and displayed onto screen 23 via character generator 126 and control 127.

It should also be noted that image 31 includes other touch pads 142 and 148 which are associated with parts by arrows or lines 149 and 150, respectively. A touch of either of these pads in step 140 causes microprocessor 60 to display a graphic image or table corresponding to the associated part, which image or table was originally generated in step 26 of FIG. 1 and also stored in CD-ROM 24.

Next, microprocessor 60 returns again to step 129, and if the user touches screen 70 over a portion of graphic image 31 exclusive of the touch pads 147 and 148, the portion of the image is zoomed in or enlarged by a factor of two and centered at the touch point in window 61. For purposes of illustration, assume that a point 145 was touched over the image of FIG. 9.

Figure 11:
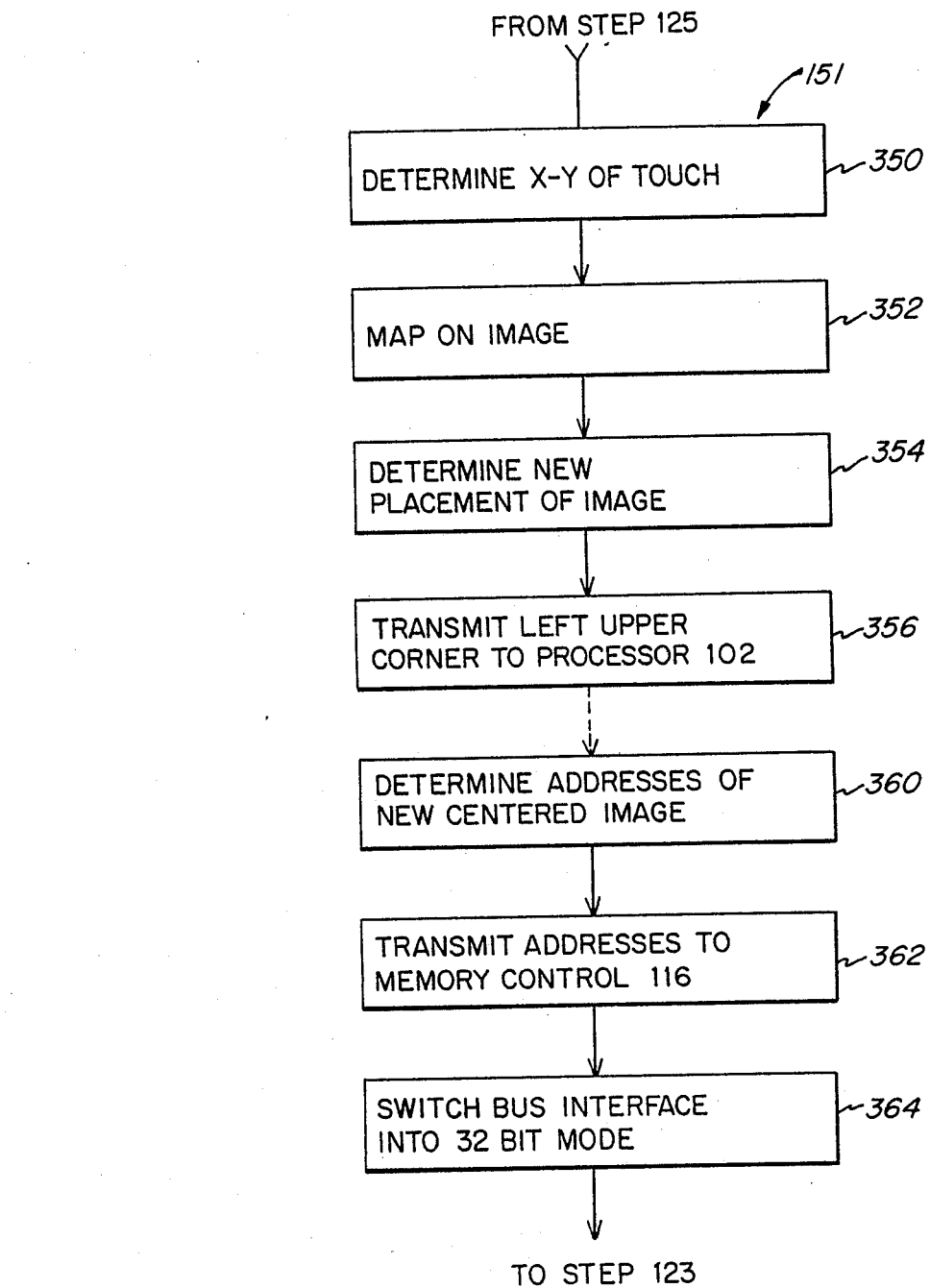
FIG. 11 is a flow chart illustrating in more detail a touch, centering and enlarging step illustrated generally in FIG. 7.

Step 151 of the flow chart of FIG. 7 is illustrated in more detail in FIG. 11. After microprocessor 60 reads interface 76 which is coupled to the output of touch screen 70, microprocessor 60 decodes the output of touch screen 70 based on this reading and the software stored in PROM 50. Thus, microprocessor 60 determines the X-Y coordinate of the touch point 145 (step 350). Next, microprocessor 60 maps the X-Y coordinates of the touch point onto the addresses of the currently displayed image to determine the pixel of the image corresponding to the point of touch (step 352). Next, microprocessor 60 determines whether this image pixel point can be perfectly centered within window 61 while still filling the entire window with the image in 2:1 enlarged or zoomed-in form. This will be the case if the touch point is relatively near the center of the image as is the case with touch point 145, but will not be the case if the touch point is relatively far from the center of the image and near a border of window 61. In the former case, the center point of the image determined in step 352 becomes the exact center point of the zoomed-in image (step 354) and the address in DRAM 99 of the upper left corner of the new 2:1 zoomed-in image is transmitted to processor 102 (step 356). In the latter case, the enlarged image is centered at the closest point to the touch point which will allow full utilization of window 61. Microprocessor 60 calculates a new center point in step 354 which will bring the touch point as close as possible to the center of window 61 without causing any image edge to appear inside the borders of window 61. For example, if the touch point perfectly centered on the window would cause the bottom right corner of the image to be above and left of the bottom right corner of window 61, then the image is positioned such that the bottom right of the image is located at the bottom right of window 61. In the event the image is smaller than the window, the image will be positioned with its top left corner adjacent to the top left corner of the window. Then processor 60 transmits the address of the upper left corner of the new image to processor 102 in step 356.

Figure 18:
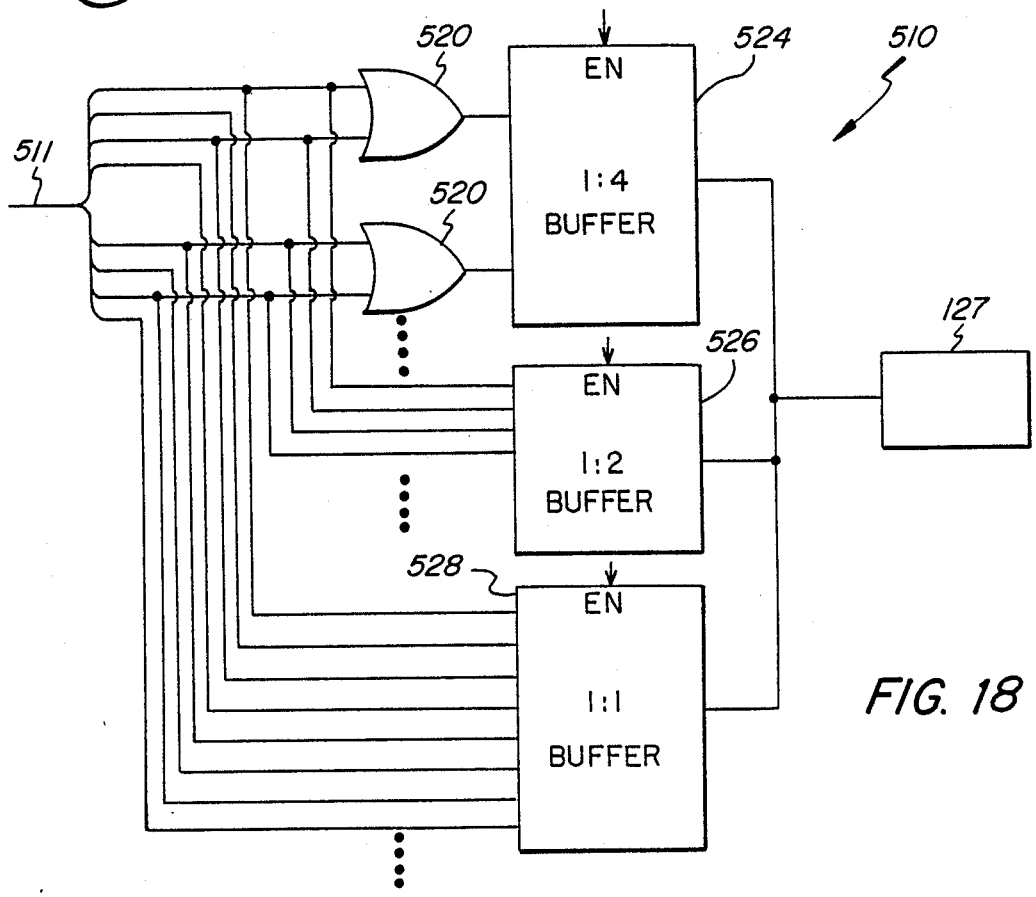
FIG. 18 is a partial, schematic diagram of logic circuitry within the interface of FIG. 17.

Processor 102 then determines the addresses of the new, centered and enlarged image (step 360) based on the new upper left corner and the known dimensions of window 61, and transmits the address information to memory control 116 (step 362). Then, processor 102 switches bus interface 128 into the 2:1 zoom-in mode (step 364) to make a 2:1 zoomed-in image, as illustrated in more detail in FIGS. 17 and 18. Microprocessor 102 enables memory banks 530 and 531 simultaneously via output enable generator 508 so that thirty-two pixels of data are supplied simultaneously to logic 510 via lines 511 and 513. Microprocessor 102 also enables 1:2 buffers 526 within logic 510 via size latch 500 so that every other pixel of data stored within memory banks 530 and 531 are supplied to pixel control 127. Thus, sixteen pixels of data are supplied simultaneously to pixel control 127, and a portion of the 1:2 zoom-out (or 2:1 zoom-in) image is generated. Then microprocessor 102 enables memory banks 532 and 533 via output enable generator 508 and enables the corresponding 1:2 buffers 526 via size latch 500 so that the next sixteen pixels of data are supplied simultaneously to pixel control 127. FIG. 18 illustrates only one of the 1:2 buffers 526 and only four inputs therefor whereas in actuality, there is one 1:2 buffer 526 for each of the memory banks 530–533 and eight inputs per buffer. The resultant enlarged image centered about point 145 is illustrated in FIG. 10.

It should be understood that for purposes of this patent application, the term "centering" means a process in which a point or region is brought at least closer to an exact center point of the display window even though it may not be brought to the exact center point.

Referring again to FIG. 7, microprocessor 60 again returns to step 129 and, after an interrupt is received, reads interface 76. If screen 70 is touched again over the enlarged graphic image (step 151), microprocessor 60 informs display processor 102 the new upper left corner of the image in the same manner noted above with reference to steps 350–356 in FIG. 11. In response, display processor 102 computes the addresses of the new 4:1 zoomed-in graphic image and directs memory control 116 to access graphic image data within DRAM 99 surrounding the touched area to fill window 61. Then, the image is displayed on display 23 in 4:1 zoomed-in form as illustrated in more detail in FIGS. 17 and 18. In this form, microprocessor 102 enables memory banks 530–533 successively, one at a time via output enable generator 508, and size latch 500 enables the corresponding 1:1 buffer 528. Thus, all sixteen pixels of data within each of the memory banks are supplied simultaneously to pixel control 127 to generate a portion of the 4:1 zoomed-in (or 1:1 zoomed-out) image.

As noted above, FIG. 18 illustrates only one of the 1:1 buffers 528 and eight inputs therefor whereas in actuality, there is one 1:1 buffer 528 for each of the memory banks 530–533 and each of the buffers 528 has sixteen inputs. Controller then combines the graphic information with the associated character information. After either or both of the foregoing iterations of steps 151, the image may be zoomed-out 1:2 by touch of a zoom key 153 on keypad 74. Another such touch zooms-out the image by 1:2 if the image is presently displayed at 2:1 zoomed-in.

Returning again to step 129, if the user now wants to run another procedure or is finished with this procedure, the user can make a corresponding entry on keypad 74 (step 134).

Figure 12A:
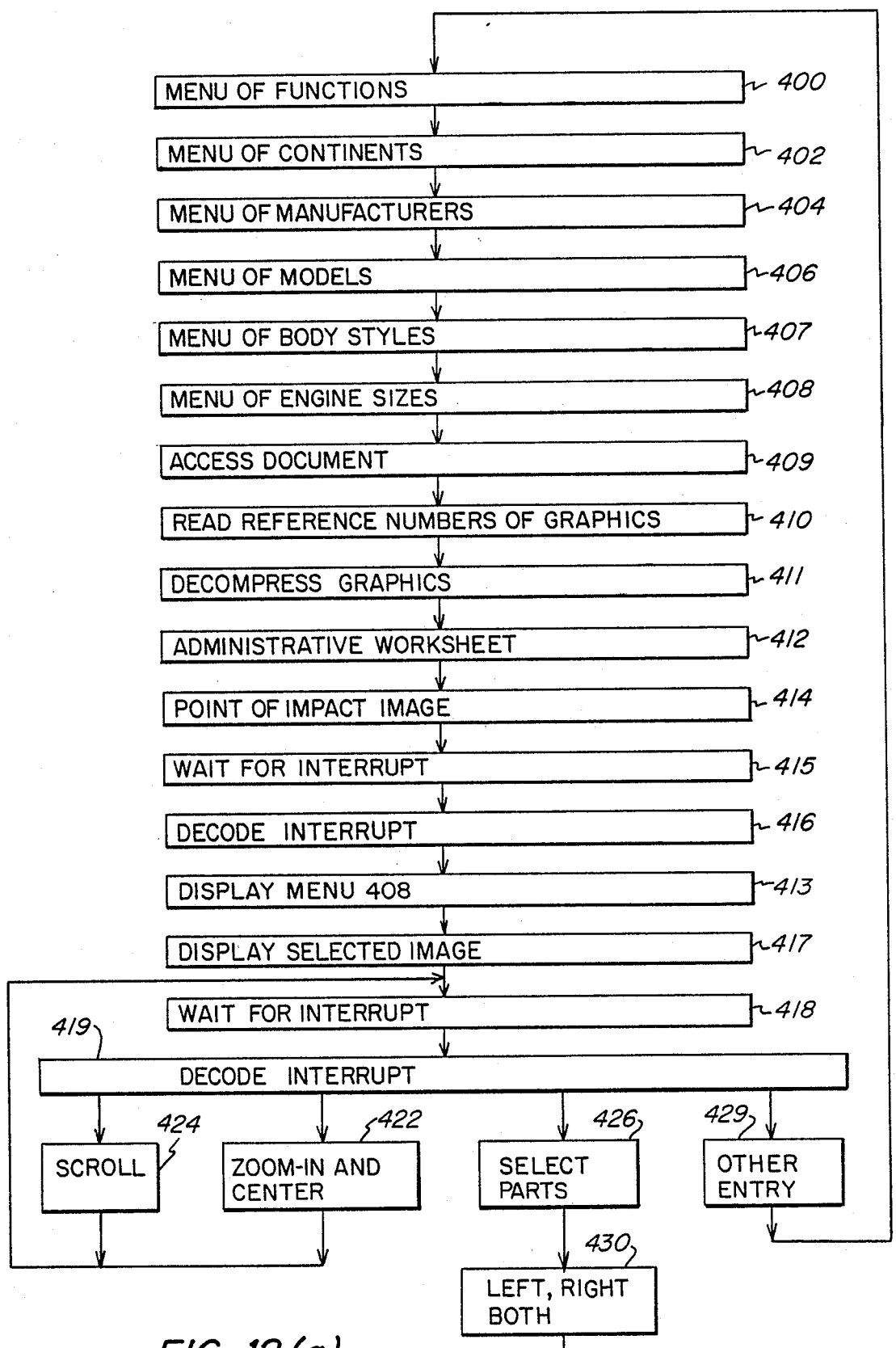
FIGS. 12(*a*) and (*b*) form a flow chart illustrating the operation of the system of FIG. 1 when programmed to implement an insurance estimation function.
Figures 12B, 13:
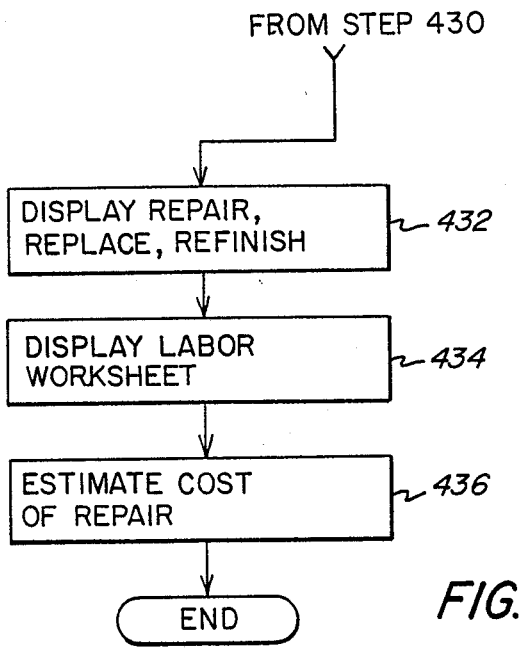
FIG. 13 is a menu displayed by the system programmed according to the flow chart of FIG. 12 which aids in identifying a subsequent graphic image for display.

FIGS. 12(a) and (b) form a flow chart illustrating the operation of system 20 when programmed to implement an insurance estimation function. To begin, microprocessor 60 is programmed to display various menus stored in DRAM 72. In step 400, microprocessor 60 displays a menu of system functions which includes, among others, the repair estimation function. After the display of this menu (and each of the subsequent menus described below), microprocessor 60 waits for an interrupt resulting from a touch selection on screen 70. If the user selects this insurance estimation function, system 20 displays a menu which includes the United States, Europe and Asia selections (step 402). Then system 20 displays a menu of manufacturers located within the selected continent such as General Motors, Ford and Chrysler located within the United States (404). Next, system 20 displays a menu of models produced by the selected manufacturer, such as the Reliant model manufactured by Plymouth (step 406). Next, system 20 displays a menu of body styles for the selected model such as "four door station wagon" (step 407) and then a menu of engine sizes (step 408). Thus, by steps 402, 404, 406, 407 and 408, the user with the aid of a hierarchical menu system, identifies the type of vehicle which was damaged. Next, microprocessor 60 addresses the corresponding document in CD-ROM 24 via bus 320 and reader 63 (step 409) which document includes text, data and graphics for estimating the cost of correcting damage to the selected vehicle. The text includes a worksheet 408 illustrated in FIG. 13 and described in more detail below. After the document is addressed, microprocessor 60 reads header information as noted above and then reads reference numerals imbedded in the document (step 410). The reference numerals identify the addresses of graphic images 448, 449 illustrated in FIGS. 14 and 15 and others within the document. Graphic image 448 is a general view of the vehicle illustrating various possible damage regions of the vehicle. The graphic image 450 is a view of one possible damage region of the vehicle, for example, the front sheet metal view. Next, microprocessor 60 directs decompression processor 96 to decompress the graphic images stored on CD-ROM 24 which are associated with the selected model (step 411). By way of example, there are approximately ten graphic images decompressed in step 411 out of approximately ten thousand stored in compressed form on CD-ROM 24.

Next, system 20 displays an administrative worksheet by which the user selects through the touch screen keyboard 500 and touch pad 74 the name and address of the owner, the insurer, if any, and other such information (step 412). Next, system 20 presents image 448 (step 414) and by means of touch pads 451–466, the user indicates the damaged region of the vehicle (step 415). This entry may be used solely for statistical purposes or may assist processor 60 in identifying a graphic image of the damaged areas. In either case, microprocessor 60 decodes interface 76 (step 416) and then displays menu 408 which lists different views of the vehicle which are available from DRAM 99 (step 413). After such display, microprocessor 60 waits for and decodes an interrupt indicating the selection. If the entry made in step 415 is used solely for statistical purposes, then the menu 408 lists all of the graphic images corresponding to the selected model. However, if the entry made in step 415 is used to begin identifying the graphic image, then touch pads of the menu 408 identify graphic images in the selected damage area. If the user touches box 431, graphic image 450 of stripes and moldings is designated for display. Consequently, microprocessor 60 notifies processor 102 that graphic image 450 stored in DRAM 99 should be displayed. Processor 102 then addresses the selected image from DRAM 99 by use of memory controller 116 and displays it in the non-enlarged form by switching bus interface 128 into the 1:4 zoom-out mode (step 417). Next, microprocessor 60 waits for an interrupt (step 418) indicating either a part selection by touch of pads 425 or a zoom-in request by touch of a point over the image of FIG. 15. Then processor 60 decodes the interrupt (step 419). In the zoomed-in form, the window 61 cannot display the entire graphic image, so the user may scroll through the image to reveal portions not previously displayed by means of scrolling pads 143 on keyboard 74 (step 424). This scrolling is provided by addressing graphic data within adjacent locations in DRAM 99. If the user touched a region of the screen overlaying the image of the vehicle, the system 20 provides a 2:1 zoom-in and centering of the image as noted above about the touch point (step 422). With or without such zooming-in, or scrolling, the user may touch one or more of the label boxes 425 (step 426), causing microprocessor 60 to read the output of interface 76 to determine the X-Y coordinates of the point of touch. Then, microprocessor 60 determines the part type which was identified by the touch of the pad by mapping the X-Y coordinates of the touch point onto a table stored in DRAM 73 which correlates each of the touch points to a part, if any, indicated by the touch pad.

Because the touch pads 425 are located outside of the image of the vehicle itself, microprocessor 60 can distinguish between a touch intended to select a part from a touch intended to enlarge and center the image of the vehicle. Lines 439 connecting the label box to the corresponding part within the graphic image are treated by the system as part of the graphic image so that a touch of one of the lines will cause an enlargment and centering of the graphic image and not a designation of a part. Thus, the process for designating parts and enlarging and centering the image is simplified.

Next, microprocessor 60 addresses from CD-ROM 24 a worksheet which lists left, right or both designations of the selected part types (step 430). Next, system 20 displays another worksheet stored in DRAM 72 which worksheet lists repair, replace or refinish selections associated with the damged parts (step 432). The user selects the desired operation. Next, system 20 displays a labor worksheet also stored in DRAM 72 which worksheet permits a user to enter the number of hours required to perform the repair, and any discount which is applicable to the repair (step 434). The data obtained from steps 426, 430, 432 and 434 is also stored in SRAM 78 for safety. Finally, either microprocessor 60 or the remote central computer 437 (FIG. 4) estimates the cost of repair based on the number of labor hours, discount, and the costs of the replacement parts. The costs of the replacement parts may be stored in CD-ROM 24 or in the central computer 437 at addresses referenced by the part number (step 436). Because the costs of parts constantly changes, it is preferable to obtain this information from the central computer.

Referring again to step 419, if the interrupt was from keypad 74 and indicates that the user wants to select another function (step 429), the system loops back to step 400.

Based on the foregoing, apparatus for storing and retrieving documents, associated text and data tables have been disclosed. However, numerous modifications and substitutions may be made without deviating from the scope of the invention. For example, the system 20 can be programmed to perform other applications such as other diagnostic, maintenance, procedural, and installation manuals, engineering standards, references and maps, in the aerospace, military, computer, telecommunications fields, and other insurance fields. Therefore, the invention has been disclosed by way of illustration and not limitation, and reference should be made to the following claims to determine the scope of the invention.

We claim:

1. A process for storing and displaying documents including graphic images, said process comprising the steps of:
   storing a multiplicity of documents in digital form;
   storing a multiplicity of graphic images in compressed, digital form, a first plurality of said graphic images being associated with a first one of said documents, said first document having references imbedded therein which correspond to the locations of said first plurality of graphic images;
   selecting said first document for processing from said multiplicity of documents;
   decompressing said first plurality of graphic images after said first document is selected;
   selecting a first decompressed graphic image from the first plurality for display;
   displaying the selected first decompressed graphic image without displaying a second decompressed graphic image in said first plurality;
   selecting said second decompressed graphic image from the first plurality for display; and
   displaying said second selected decompressed graphic image after displaying said first decompressed graphic image.

2. A process as set forth in claim 1 wherein said first decompressed graphic image is automatically selected when said first document is selected.

3. A process as set forth in claim 1 wherein said second decompressed graphic image is manually selected after said first decompressed graphic image is displayed.

4. A process as set forth in claim 1 further comprising the step of displaying on a display screen, simultaneously with said first decompressed graphic image, selection information corresponding to said second decompressed graphic image; and
   wherein said second decompressed graphic image is selected by touching a region of a touch screen, said touch screen overlaying said display screen and said region corresponding to said selection information.

5. Apparatus for storing and displaying a graphic image, said apparatus comprising:
   first means for storing a first graphic image in digital form;
   a display;
   control means coupled to the first storing means for retrieving said first graphic image and inputting the retrieved image to said display;
   a touch screen overlaying said display; and
   decoding means, coupled to an output of said touch screen, for identifying a first region of said first graphic image displayed on said display corresponding to a first region touched on said touch screen;
   wherein said control means includes means responsive to said decoding means, for enlarging and centering said first region of said first graphic image on said display;
   said control means further comprising:
   pixel control means for controlling a zoom size of images displayed by said display;
   bus means for coupling data from said first storing means to said pixel control means; and
   processor means coupled to said first storing means and said bus and programmed to control a number of pixels of data supplied simultaneously by said bus to said pixel control means in accordance with the zoom size of an image.

6. An apparatus as set forth in claim 5 wherein said control means further includes means for displaying document text on said display simultaneously with said first graphic image when said first graphic image is in either non-enlarged or said enlarged and centered form.

7. An apparatus as set forth in claim 5 wherein said first storing means stores graphic images in compressed form, said apparatus further comprising:
   second means for storing a multiplicity of documents in digital form; and
   document selection means for selecting a first one of said documents for display;
   wherein said control means is responsive to said selection of said first document, to decompress said first graphic image and a second graphic image stored in said first storing means; and
   further comprising image selection means for selecting said first decompressed graphic image to display;
   wherein said control means is responsive to the image selection means to display said first decompressed graphic image without displaying said second decompressed graphic image.

8. Apparatus for estimating the cost of repairing vehicular or other damage, said apparatus comprising:
   a computer;
   means for inputting a model designation of a damaged vehicle or other object to said computer;
   a display coupled to said computer;
   means responsive to the inputting of a model designation, for retrieving a plurality of graphic images of said model and parts making up said model from an image storage device coupled to said computer;
   control means coupled to the retrieving means for enabling a user to select a first one of said images and display the selected image on said display;
   a touch screen coupled to said computer and overlaying said display;
   identifying means responsive to a user's touches on said touch screen for determining the identity of a damaged part touched on the selected image based on the location of the user's touch;
   processor means responsive to said identifying means for processing information relating to the identified part; and means coupled to said processor means for inputting a decision whether to repair or replace damaged parts, and wherein said processor means determines the cost of correcting said damage based in part on the repair or replace decision.

9. An apparatus as set forth in claim 8 wherein the identifying means identifies a region of said model in said first graphic image corresponding to a touch on said touch screen; and said control means includes means responsive to said identifying means for enlarging and centering said first graphic image about the identified region.

10. An apparatus as set forth in claim 9 wherein said control means causes said display to display touch pads outside of said model and lines between the touch pads and associated parts so that a touch on said touch screen over the model causes said control means to enlarge and center said first graphic image and a touch outside of said model over a touch pad identifies a damaged part without causing said control means to enlarge and center the image about said touch pad.

11. An apparatus as set forth in claim 8 wherein:
the identifying means identifies a region of said model in said first graphic image corresponding to a touch on said touch screen;
said first graphic image is a view of the model as a whole; and
said control means is responsive to the identifying means for controlling said display to display a second, more detailed one of said graphic images corresponding to the identified region of said model.

12. An apparatus as set forth in claim 11 wherein said control means controls said display to display a menu indicating a variety of said graphic images including said second graphic image corresponding to the identified region of said model.

13. Apparatus for storing and displaying documents including graphic images, comprising:
means for storing a multiplicity of documents and graphic images in digital form, a first plurality of said graphic images being associated with a first one of said documents, said first document having references imbedded therein which correspond to the locations of said first plurality of graphic images;
means coupled to said storing means for selecting said first document and a first graphic image from the first plurality for display;
means coupled to said selecting means for displaying the selected first graphic image without displaying a second graphic image in said first plurality;
means coupled to said storing means for selecting a second graphic image from the first plurality for display; and
means coupled to said selecting means for displaying said second graphic image after displaying said first graphic image.

14. Apparatus for displaying a graphic image comprising:
a computer processor;
a display coupled to said computer processor;
a touch screen overlaying said display and coupled to said computer processor;
means responsive to said computer processor for defining a graphic image area on said display and a separate control area on said display apart from said graphic image area;
means responsive to said computer processor for generating a graphic image in said graphic image area;
means responsive to said computer processor for generating a display of touch pads in said control area, each touch pad corresponding to a different component of the graphic image;
means responsive to said computer processor for providing an indicia on said display to identify a component of said graphic image when the touch pad corresponding to the component is touched by a user; and
means responsive to said computer processor for enlarging the graphic image displayed in said graphic image area when the graphic image is touched by a user.

15. A process for storing and displaying documents including graphic images, said process comprising the steps of:
storing a multiplicity of documents in digital form;
storing a multiplicity of graphic images in compressed, digital form, a first plurality of said graphic images being associated with a first one of said documents;
selecting said first document for processing from said multiplicity of documents;
decompressing said first plurality of graphic images after said first document is selected;
displaying first selection information corresponding to a first decompressed graphic image in said first plurality and second selection information corresponding to a second decompressed graphic image in said first plurality;
selecting said first decompressed graphic image for display by touching a region of a touch screen overlaying said first selection information;
displaying said first decompressed graphic image without displaying said second decompressed graphic image;
selecting said second decompressed graphic image for display by touching a second region of said touch screen overlaying said second selection information;
displaying said second selected decompressed graphic image after displaying said first decompressed graphic image;
displaying third selection information representing a command to scroll the display of said first document;
touching a third region of said touch screen corresponding to said third selection information; and
scrolling said first document in response to the touching of said third region of said touch screen.

16. A process as set forth in claim 15 wherein said first document comprises text and further comprising the step of displaying said text simultaneously with but apart from said first graphic image.

17. A process as set forth in claim 16 wherein:
said text describes a procedure for repairing a vehicle; and
said first graphic image illustrates the portion of said vehicle under repair, according to said text.

18. A process as set forth in claim 17 wherein said first document includes a data table and further comprising the steps of:
imbedding in said first document a reference to said data table; and
displaying said data table.

* * * * *